United States Patent
Schacht

(10) Patent No.: US 9,004,513 B1
(45) Date of Patent: Apr. 14, 2015

(54) BICYCLE FENDER SYSTEM

(71) Applicant: Stefan Richard Schacht, Bellingham, WA (US)

(72) Inventor: Stefan Richard Schacht, Bellingham, WA (US)

(*) Notice: Subject to any disclaimer, the term of this patent is extended or adjusted under 35 U.S.C. 154(b) by 21 days.

(21) Appl. No.: 13/839,105

(22) Filed: Mar. 15, 2013

(51) Int. Cl.
*B62J 15/00* (2006.01)

(52) U.S. Cl.
CPC ........................... *B62J 15/00* (2013.01)

(58) Field of Classification Search
CPC .................................. B62J 15/00; B62J 15/04
USPC ................... 280/152.1, 152.2, 152.3
See application file for complete search history.

(56) References Cited

U.S. PATENT DOCUMENTS

| | | | |
|---|---|---|---|
| 590,980 A * | 10/1897 | Hall | 280/152.3 |
| 750,386 A * | 1/1904 | Neinens et al. | 280/152.3 |
| 868,461 A * | 10/1907 | Lockwood | 280/152.3 |
| 5,700,022 A * | 12/1997 | Finnson | 280/152.3 |
| 5,918,904 A * | 7/1999 | Hanesworth | 280/852 |
| 5,954,354 A * | 9/1999 | Chung | 280/152.1 |
| 6,331,011 B1 * | 12/2001 | Feldmann et al. | 280/152.1 |
| 6,367,832 B1 * | 4/2002 | Vogel | 280/152.1 |
| 2004/0227323 A1 * | 11/2004 | Hsu | 280/152.3 |
| 2010/0140896 A1 * | 6/2010 | McHale | 280/152.3 |

OTHER PUBLICATIONS

Topeak Cycling, "MTB Fenders Rear", Website http://web.archive.org/web/20120401065136/http://topeak.com/products/MTB-Fenders--Rear, 2012, 6 pages.

* cited by examiner

*Primary Examiner* — Kevin Hurley
(74) *Attorney, Agent, or Firm* — Michael R. Schacht; Schacht Law Office, Inc.

(57) ABSTRACT

A fender system for a bicycle has a first base member, a second base member, a fender, and at least one return member. The first base member is secured relative to the bicycle. The second base member is rotatably supported by the first base member. The fender is secured to the second base member. The at least one return member biases the second base member into an initial position relative to the first base member.

26 Claims, 6 Drawing Sheets

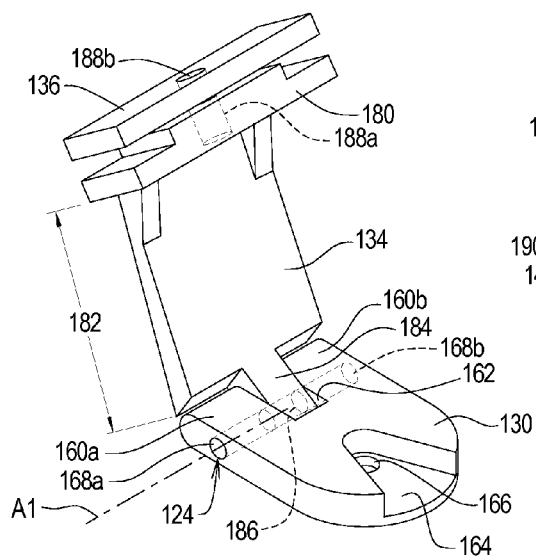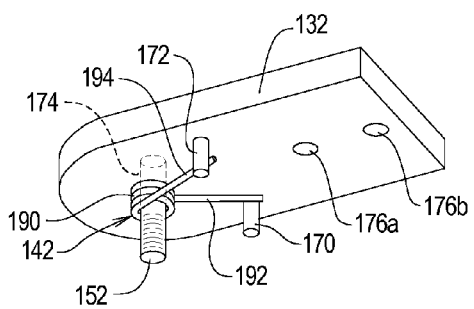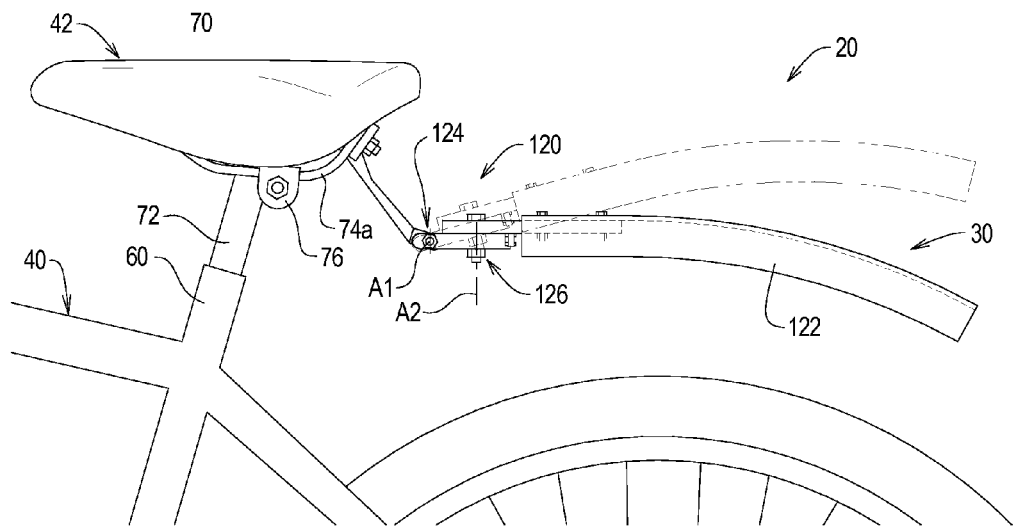

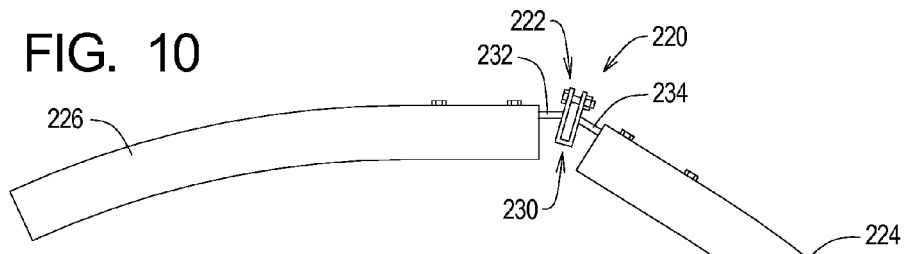
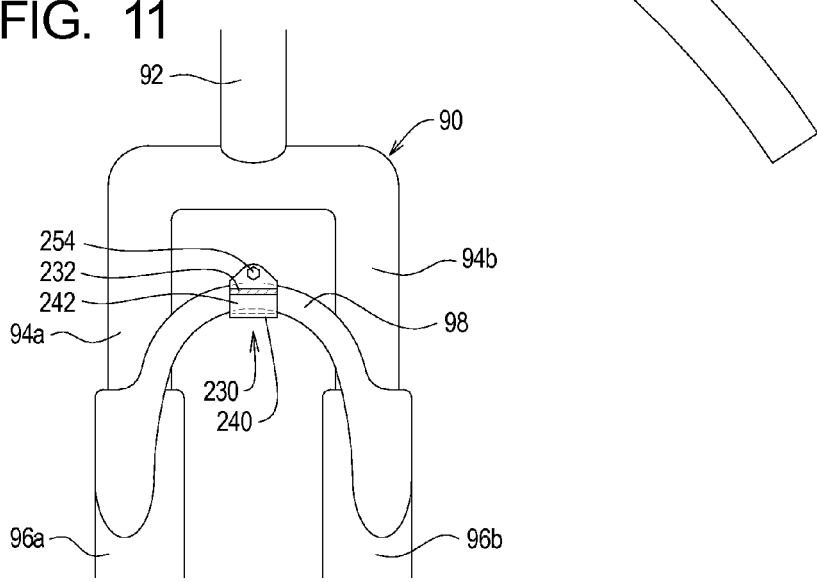
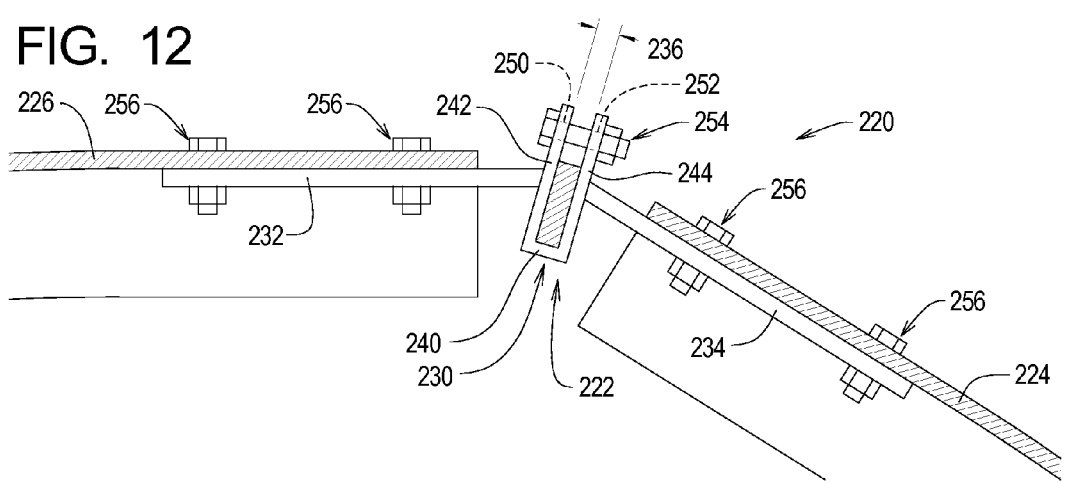

BICYCLE FENDER SYSTEM

TECHNICAL FIELD

The present invention relates to bicycle fender systems and methods and, more particular, to bicycle fender systems adapted to be used on full suspension bicycles.

BACKGROUND

Suspension systems for bicycles allow significant movement between the front wheel, the rear wheel, and/or the seat with respect to the main bike frame and the handle bar and the pedal assembly supported by the main bike frame. The suspension system thus inhibits transmission of shocks to the rider holding the handle bar and standing on the pedals when the bicycle lands after dropping or jumping.

The term "full suspension bicycle" typically refers to a bicycle having at least a front suspension that allows movement of the front wheel relative to the main frame and a rear suspension that allows movement of the rear wheel relative to the main frame. Certain types of full suspension bicycles (e.g., downhill bikes) are designed to resiliently oppose a significant range of movement between the wheels and the main frame.

Further, certain types of bikes employ dynamically adjustable seat posts that allow the height of the seat relative to the frame to be adjusted while the bicycle is being ridden to accommodate for different riding conditions (e.g., riding uphill or riding downhill).

Traditional bicycle fender systems do not work well with full suspension bicycles because the significant variability of the relative positions of the frame, seat, front wheel, and rear wheel make it difficult to find a location to which the fender assembly can be mounted and not interfere with the movement of the various components of the bicycle.

Further, the position of the rider is also highly variable during the riding of full suspension bicycles. For example, on steep downhill terrain, the rider may move his rear end significantly behind and even below the seat to adjust the center of gravity to accommodate the downhill slope.

And on technical terrain, the rider may need to dismount and remount the bicycle frequently. In particular, the placement of rear fenders can interfere with the dismounting and remounting of the bicycle, or the rider dismounting or remounting the bicycle may kick and break or twist the rear fender.

The need thus exists for fender systems and methods for full suspension bicycles that accommodate the wide range of movement of the various components of the bicycle and of the rider, especially during extreme riding conditions.

SUMMARY

The present invention may be embodied as a fender system for a bicycle comprising a first base member, a second base member, a fender, and at least one return member. The first base member is secured relative to the bicycle. The second base member is rotatably supported by the first base member. The fender is secured to the second base member. The at least one return member biases the second base member into an initial position relative to the first base member.

The present invention may also be embodied as a method of supporting a fender relative to a bicycle having a seat assembly comprising the following steps. A first base member is secured relative to the bicycle. A second base member is rotatably supported by the first base member. The fender is secured to the second base member. The second base member is biased into an initial position relative to the first base member.

The present invention may also be embodied as a fender system for a bicycle comprising a fork system defining an arch brace. The fender system comprises a mounting member comprising a collar portion adapted to fit around the arch brace, a first plate portion extending from the collar portion forward of the brace arch, and a second plate portion extending from the collar portion rearward of the brace arch. A clamp system clamps the collar member onto the arch brace. A first front fender is secured to the first plate portion. A second front fender is secured to the second plate portion.

BRIEF DESCRIPTION OF THE DRAWINGS

FIG. 3 is a perspective view of a first pivot member member and a stand-off member used by the first example rear fender mounting system;

FIG. 4 is a perspective view of a second pivot member of the of the first example rear fender mounting system;

FIG. 5 is a side elevation view illustrating a first example vertical pivot system that allows the first degree of movement by the first example rear fender mounting system;

FIG. 10 is a side elevation view depicting the major components of a first example front fender mounting system used by the first example fender system;

FIG. 11 is a front elevation view illustrating engagement of the first example front fender mounting system with a fork system of the example full suspension bicycle;

FIG. 12 is a section view illustrating details of the engagement of the first example front fender mounting system of the present invention;

DETAILED DESCRIPTION

Figure 1:
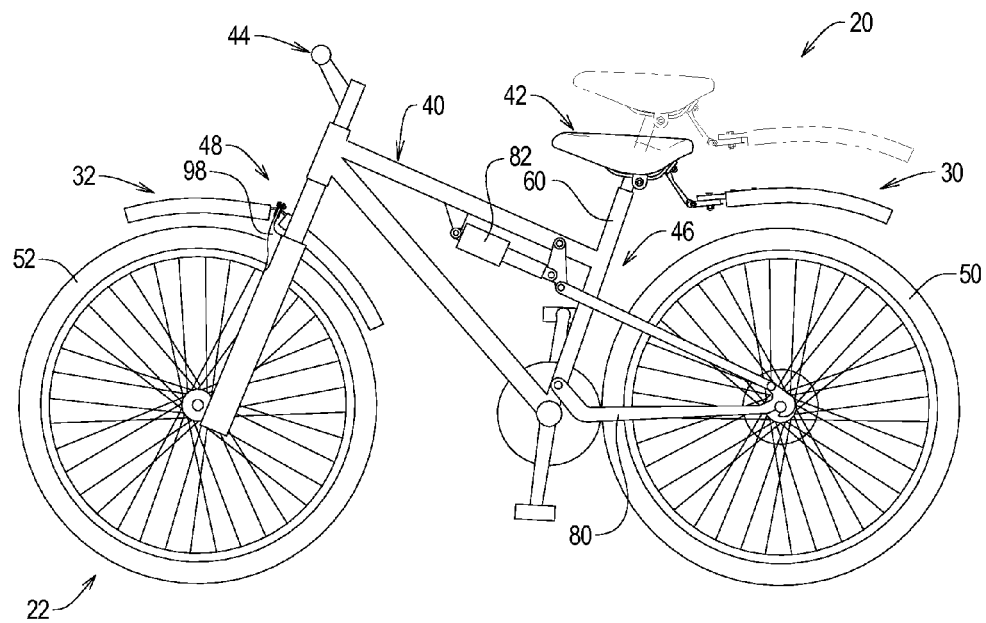
FIG. 1 is a side elevation view depicting a first example fender system of the present invention as mounted on a full suspension bicycle.

Referring initially to FIG. 1 of the drawing, depicted therein is a first example fender system 20 constructed in accordance with, and embodying the principles of the present invention. The first example fender system 20 is adapted to be mounted to an example full suspension bicycle 22. The first example fender system 20 comprises a rear fender assembly 30 and a front fender assembly 32. The full suspension bicycle 22 is not per se part of the present invention but will now be described herein to that extent helpful for a complete understanding of the first example fender system 20.

FIG. 1 illustrates that the example bicycle 22 comprises a main frame 40, a seat assembly 42, a handle bar assembly 44, a rear suspension system 46, and a fork system 48. FIG. 1 further illustrates that the rear suspension system 46 supports a rear wheel assembly 50 relative to the main frame 40 and that the front suspension system 48 supports a front wheel assembly 52 relative to the main frame 40.

As shown in FIG. 1, the main frame 40 defines a seat post tube 60 and a steering cylinder 62. As perhaps best shown in FIG. 5, it can be seen that the example seat assembly 42 comprises a seat member 70, a seat post 72, a pair of seat rails 74a and 74b connected to the seat member 70, and a seat bracket 76 connected to the seat post 72. The seat bracket 76 connects the seat post 72 to the seat rails 74a and 74b. The seat post tube 60 receives the seat post 72 to support the seat assembly 42 relative to the frame 40. In the example bicycle 22, the seat post 72 is dynamically adjustable to allow a position of the seat assembly 42 relative to the frame 40 to be adjusted, as shown by solid and broken lines in FIG. 1, while the bicycle 22 is being ridden.

The example rear suspension system 46 comprises a rear suspension frame 80 and a shock absorber 82 (FIG. 1). The rear suspension frame 80 supports the rear wheel assembly 50 and is pivotably connected to the main frame 40. The shock absorber 82 is configured to resiliently oppose movement of the rear suspension frame 80 relative to the main frame 40 when upward forces are applied to the rear wheel assembly 50.

The example fork system 48 comprises a fork 90 comprising a steerer tube 92 and first and second legs 94a and 94b. First and second sliders 96a and 96b are supported for sliding movement along the first and second legs 94a and 94b, respectively. A brace arch 98 extends between the first and second sliders 96a and 96b to rigidify the fork system 48 and coordinate movement of the first and second sliders 96a and 96b. The sliders 96a and 96b are in turn connected to the front wheel assembly 52. The fork system 48 is configured to resiliently oppose movement of the sliders 96a and 96b along the legs 94a and 94b to inhibit transmission of upward forces on the front wheel assembly 52 to the fork 90. The steerer tube 92 is received by the steering cylinder 62 and supports the handle bar assembly 44.

Full suspension bicycles are produced in many dimensions and geometries, and the example bicycle 22 is described herein merely to define certain reference points relevant to the construction and use of the first example fender system 20. The first example fender system 20 is designed to be used with many geometries and configurations of full suspension bicycles that define similar reference points as will be described in detail below.

Figure 2:
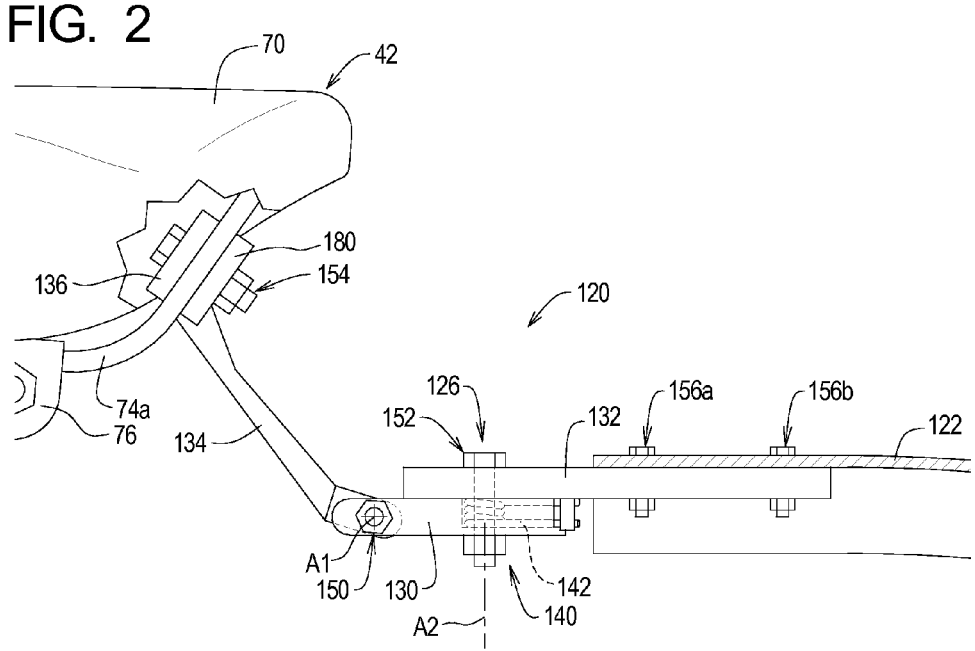
FIG. 2 is a side elevation view depicting the major components of a first example rear fender mounting system used by the first example fender system.

Turning now to FIG. 2 of the drawing, depicted therein is a first example rear fender mounting system 120 used by the example rear fender assembly 30 to mount a rear fender 122 to the bicycle 22. As perhaps best shown in FIG. 5 of the drawing, the first example rear fender mounting system 120 comprises a vertical pivot system 124 for allowing movement of the fender 122 about a first pivot axis A1 and a first example lateral pivot system 126 for allowing movement of the fender 122 about a second pivot axis A2.

Turning now to FIG. 2 of the drawing, it can be seen that the first example rear fender mounting system 120 comprises a first base member 130, a second base member 132, a spacing member 134, and an anchor member 136. FIGS. 2, 3, 7, and 8 illustrate that the first example lateral pivot system 126 comprises a return system 140 comprising a return spring 142. The example rear fender mounting system 120 further comprises a first bolt assembly 150 for connecting the first base member 130 to the spacing member 134, a second bolt assembly 152 for connecting the second base member 132 to the first base member 130, an anchor bolt assembly 154 for attaching the spacing member 134 to the anchor member 136, and a pair of attachment bolt assemblies 156a and 156b for attaching the fender 122 to the second base member 132.

Referring now to FIG. 3, the first base member 130 used by the first example rear fender mounting system 120 will now be described in further detail. The example first base member 130 comprises a first base arm 160a and a second base arm 160b that define a base notch 162. The example first base member 130 further defines a spring socket 164, a first lateral pivot opening 166, and first and second vertical pivot openings 168a and 168b.

The example second base member 132 is depicted in FIG. 4. First and second spring posts 170 and 172 protrude from the example second base member 132, and a second lateral pivot opening 174 extends through the second base member 132. First and second fender bolt holes 176a and 176b are also formed in the example second base member 132.

FIG. 3 illustrates that the spacing member 134 comprises a seat portion 180, a spacing portion 182, and a spacing arm 184. A third vertical pivot opening 186 is formed in the spacing arm 184, and a corresponding set of first and second seat bolt holes 188a and 188b is formed in the seat portion 180 and the anchor plate 136, respectively.

Figure 7:
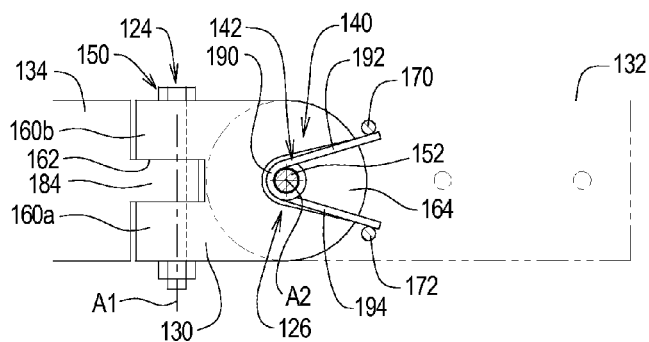
FIG. 7 is a top plan section view illustrating the first example lateral pivot system in a centered position.
Figure 8:
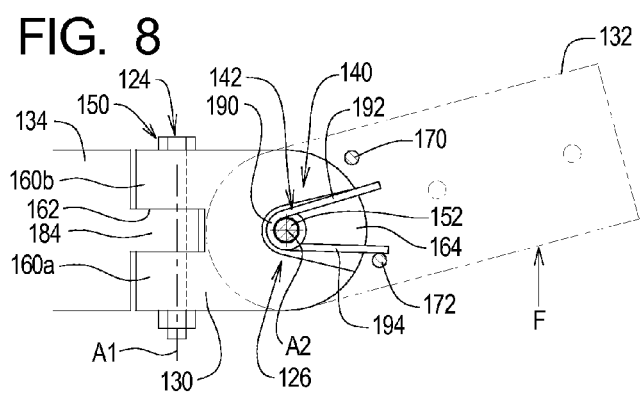
FIG. 8 is a top plan section view illustrating the first example lateral pivot system in a first side position.

FIGS. 4, 7, and 8 show that the example return spring 142 is a torsion spring having a helical portion 190 and first and second spring arms 192 and 194 extending from the helical portion 190.

The first example rear mounting system 120 is assembled according to the following method. The bolt of the second bolt assembly 152 is passed through the second lateral pivot opening 174 and through the helical portion 190 of the spring 142. The first and second spring arms 192 and 194 are arranged between, and engage, the first and second spring posts 170 and 172, respectively.

The second base member 132 is then displaced until the bolt of the second bolt assembly 152 passes through the first lateral pivot opening 166. At this point the return spring 142 should be located within the spring socket 164. The second bolt assembly 152 is then formed to secure the first and second base members 130 and 132 together with the return spring 142 securely held within the spring socket 164.

The bolt of the first bolt assembly 150 is next inserted through the first vertical pivot opening 168a, third vertical pivot opening 186, and the second vertical pivot opening 168b. Assembly of the first bolt assembly 150 secures the first base member 130 for pivoting movement relative to the spacing member 134.

Figure 9:
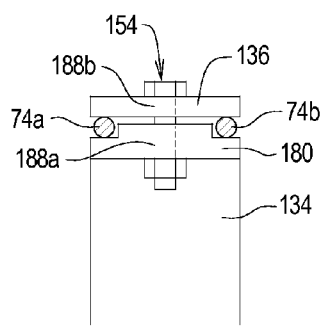
FIG. 9 is a section view illustrating a seat mounting system for securing the first example rear fender mounting system to a seat of the full suspension bicycle.

The seat bolt assembly 154 is then extended through the seat bolt holes 188a and 188b to clamp the seat rails 74a and 74b between the seat portion 180 and the anchor plate 136. The seat portion 180 and anchor plate 136 are adapted to frictionally engage the seat rails 74a and 74b as perhaps best shown in FIG. 9 such that movement of the seat portion 180 relative to the rails 74a and 74b is substantially prevented when the seat bolt assembly 154 is tightened. A position of the seat portion 180 relative to the rails 74a and 74b can be adjusted to obtain some angular and height adjustment of the rear fender assembly 30 relative to the seat member 70.

Additionally, a length of the intermediate portion 182 determines a distance between the first and second base members 130 and 132 (and thus the fender 122) relative to the seat assembly 42. Different spacing members 134 may be provided with different lengths of intermediate portions 182 to provide a choice of distances between the first and second base members 130 and 132 relative to the seat assembly 42. Alternatively, the spacing member 134 may be formed of first and second parts that engage each other to allow linear sliding movement relative to each other to allow the length of the intermediate portion 182 to be adjusted to a desired length. In this case, a locking mechanism would be provided to secure the first and second parts together to fix the desired length.

With the rear fender assembly 30 so secured to the seat assembly 42, further adjustment of an angle of the fender assembly 30 may be obtained using the first pivot system 124 as follows. When the first bolt assembly 150 is inserted along the bolt base openings 168*a*, 186, and 168*b* as described above and left untightened, the first and second base members 130 and 132 and fender 122 attached thereto may be pivoted about the first pivot axis A1 as shown in FIG. 5. When the fender 122 is at a desired orientation selected based on bicycle dimensions and geometry and an expected set of riding conditions, the first bolt assembly 150 is tightened such that the spacing arm 184 is clamped between the first and second base arms 160*a* and 160*b*.

With the spacing arm 184 securely clamped between the first and second base arms 160*a* and 160*b*, the base arms 160*a* and 160*b* frictionally engage the spacing arm 184 to inhibit pivoting of first and second base members 130 and 132, and thus the fender 122, about the first pivot axis A1. The mating surfaces of the spacing arm 184 and base arms 160*a* and 160*b* may be textured, or radial grooves and projections may be formed in or on these mating surfaces, to increase friction and/or provide a positive mechanical engagement between these mating surfaces that further inhibits pivoting of the fender 122 about the first pivot axis A1.

Figure 6:
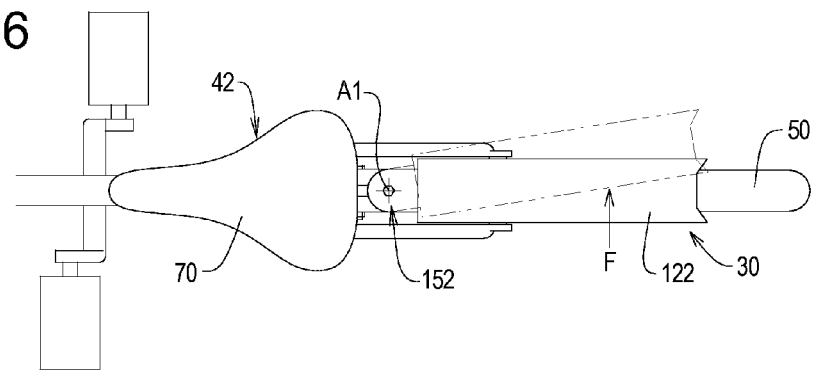
FIG. 6 is a top plan view illustrating a first example lateral pivot system that allows the second degree of movement by the first example rear fender mounting system.

Referring now more specifically to FIGS. 6, 7, and 8, it can be seen that the second bolt assembly 152 secures the first and second base members 130 and 132 together such that these members 130 and 132 rotate relative to each other about the second pivot axis A2. With the spacing member 134 secured to the seat assembly 42 and the first base member 130 secured to the spacing member 134 as described above, the second base member 132, and thus the fender 122 attached thereto, pivot relative to the rear wheel assembly 50 as perhaps best shown in FIG. 6.

FIG. 7 illustrates that the arms 192 and 194 of the return spring 142 act on the walls of the spring socket 164 and on the first and second spring posts 170 and 172 such that the second base member 132 is biased into a centered position in which the fender 122 is aligned with the rear wheel assembly 50. FIGS. 6 and 8 illustrate that, when a force F is applied to the fender 122 in a first direction such that the fender 122 is displaced out of the centered position, the first spring arm 192 engages a wall of the spring socket 164 and the second spring arm 194 engages the second spring post 172 such that the second base member 130 is biased back towards the centered position in which the fender 122 is aligned with the rear wheel assembly 50. The return spring 142 will apply a similar return force when the fender 122 is displaced in the direction opposite of that of the force F depicted in FIG. 6. The first example lateral pivot system 126 thus is self-centering such that, if the fender 122 is kicked or otherwise moved out of its normal, aligned position, the fender will automatically be returned to the normal, aligned position.

Turning now to FIGS. 10-12 of the drawing, the example front fender assembly 32 will now be described. The example front fender assembly 32 comprises a fender mounting system 220 comprising a mounting member 222 for securing first and second front fender members 224 and 226 relative to the fork system 48. The example mounting member 222 comprises a collar portion 230 and first and second plate portions 232 and 234. A collar gap 236 is formed between the plate portions 232 and 234.

The collar portion 230 defines a collar plate 240, a first collar arm 242, and a second collar arm 244. First and second collar arm openings 250 and 252 are formed in the first and second collar arms 242 and 244, respectively. A collar bolt assembly 254 is sized and dimensioned to extend through the collar arm openings 250 and 252. Fender plate bolt assemblies 256 are used to secure the fenders 224 and 226 to the first and second first and second plate portions 232 and 234 as shown in FIG. 12.

As shown in FIGS. 1 and 11, the brace arch 98 of the example fork system 48 extends over the front wheel assembly 52. And because the brace arch 98 is secured to the first and second sliders 96*a* and 96*b*, a position of the brace arch 98 with respect to the front wheel assembly 52 is fixed. The collar portion 230 of the mounting member 222 is sized and dimensioned to fit around the brace arch 98 with the first collar arm 242 in front of the brace arch 98 and the second collar arm 244 behind the brace arch 98. The collar plate 240 also engages a bottom surface portion of the brace arch 98. The collar bolt assembly 254 engages the first and second collar arms 242 and 244 above the brace arch 98 such that, when the collar bolt assembly 254 is fully tightened, the brace arch 98 is firmly clamped between the first and second collar arms 242 and 244.

With the collar portion 230 of the mounting member 222 so secured to the brace arch 98, the fender connecting plates 232 and 234 extend from the first and second collar arms 242 and 244, respectively, such that the first and second fender connecting plates 232 and 234 extend above the rear wheel assembly 52 and to the rear of the fork system 48 and above the front wheel assembly 52 and the front of the fork system 48, respectively. With the mounting member 222 attached to the brace arch 98 and the fenders 224 and 226 connected to the fender connecting plates 232 and 234, the first and second fenders 224 and 226 also extend above the front wheel assembly 52 and to the rear of the fork system 48 and above the front wheel assembly 52 and the front of the fork system 48, respectively. The mounting member 222 and the fenders 224 and 226 attached thereto are held in a desired relationship with the front wheel assembly 52 even as the fork system 48 allows the front wheel assembly 52 to move relative to the frame 40.

Figure 13:
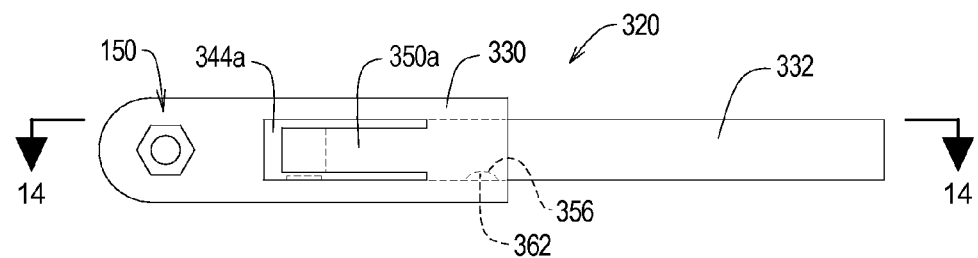
FIG. 13 is a side elevation view of a second example lateral pivot system that may be used by the first example rear fender assembly of the present invention.
Figure 14:
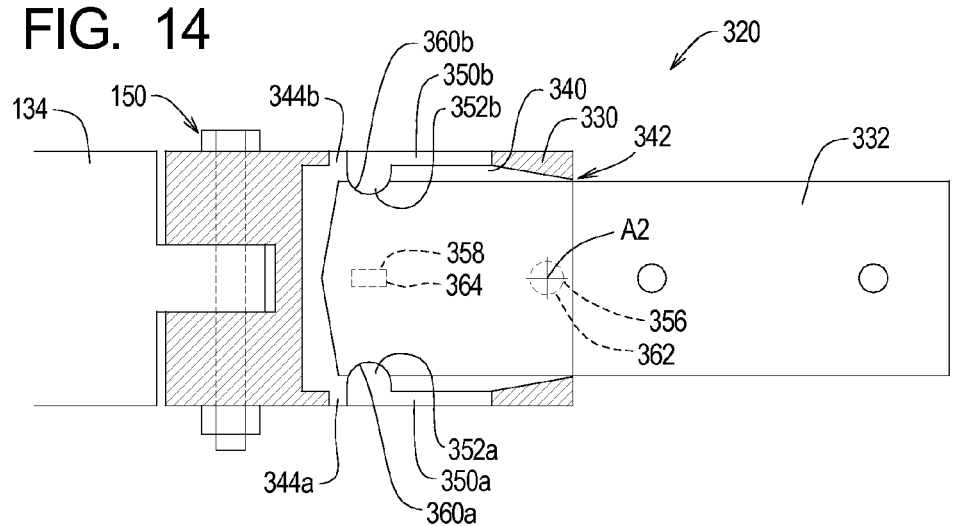
FIG. 14 is a top plan section view illustrating the second example lateral pivot system in a centered position.
Figure 15:
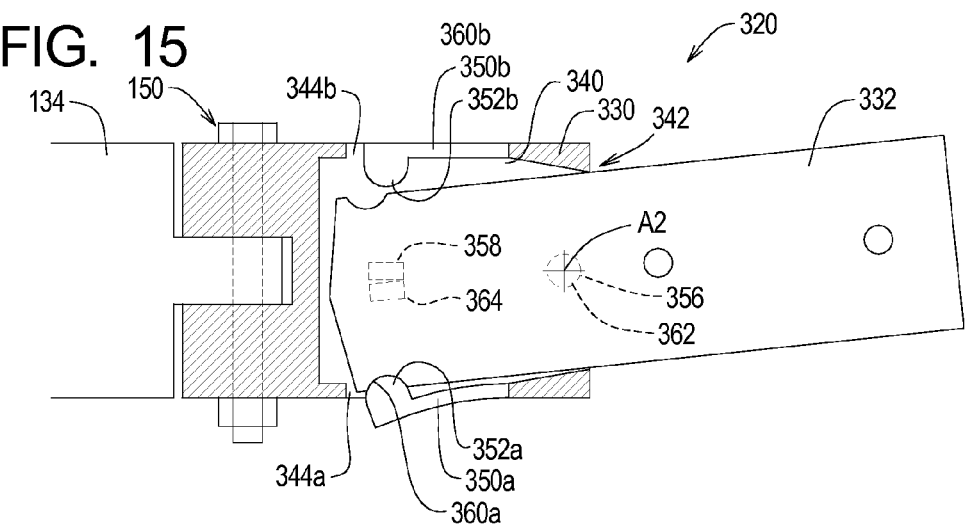
FIG. 15 is a top plan section view illustrating the second example lateral pivot system in a first side position.

Turning now to FIGS. 13, 14, and 15 of the drawing, depicted therein is a second example lateral pivot system 320 that may be used in place of the first example lateral pivot system 126 described above. The second example lateral pivot system 320 comprises a first base member 330 and a second base member 332. The first base member 330 is adapted to be connected to the example spacing member 134 to form a vertical pivot system like the vertical pivot system 124 described above. The second base member 332 is adapted to be attached to a fender such as the example fender 122 defined above.

The example first base member 330 further defines a base chamber 340, a main opening 342, and first and second side slots 344*a* and 344*b*. First and second latch members 350*a* and 350*b* lie within the first and second side slots 344*a* and 344*b*, respectively. First and second latch projections 352*a* and 352*b* extend from the first and second latch members 350a and 350b, respectively, and into the base chamber 340. A pivoting projection 356 and a centering projection 358 extend from the first base member 330 into the base chamber 340. The example second base member 332 defines first and second latch notches 360a and 360b, a pivoting recess 362, and a centering recess 364.

The second base member 332 is sized and dimensioned such that at least a portion thereof may be inserted into the base chamber 340. The first and second latch projections 352a and 352b are received by the first and second latch notches 360a and 360b when the second base member 332 is fully inserted into the base chamber 340. The first and second latch members 350a and 350b are resiliently deformable (as generally shown in FIG. 15) to allow the second base member 332 to be inserted to a position in which the latch notches 360a and 360b receive the latch projections 352a and 352b as shown in FIG. 14. Engagement of the latch projections 352a and 352b and the latch notches 360a and 360b inhibits inadvertent movement of the second base member 332 out of the base chamber 340. It should be apparent that the positions of the latch members 350a and 350b and the latch projections 352a and 352b may be changed such that the latch members 350a and 350b are formed on the second base member 332 and the latch projections 352a and 352b are formed on the first base member 330.

Additionally, when the second base member 332 is fully inserted into the base chamber 340, the pivoting recess 362 receives the pivoting projection 356 to define the second pivot axis A2 of the second lateral pivot system 320. To facilitate insertion of the second base member 332 into the base chamber 340, the pivoting projection 356 and pivoting recess 362 take the form of a portion of a sphere. The rounded surface of the pivoting projection 356 provides a cam surface that forces the walls of the first base member 330 defining the main opening 342 slightly apart to allow the pivoting recess 362 eventually to receive the pivoting projection 356. A that point, the walls of the first base member 330 return to their original, substantially parallel configuration, and the pivoting projection 356 and pivoting recess 362 cooperate to inhibit inadvertent movement of the second base member 332 out of the base chamber 340.

Further, when the second base member 332 is fully inserted into the base chamber 340 and in an aligned position as shown in FIG. 14, the centering cavity 364 receives the centering projection 358. The centering cavity 364 receives the centering projection 358 to require that a predetermined release force be applied to the second base member 332 or the fender 122 supported thereby before the second base member 332 is displaced out of the aligned position. The centering cavity 364 comprises walls that are curved or slanted in a direction tangential to a circle centered at the second pivot axis A1. The depth of the centering cavity 364 and the contour of the walls formed thereby can be adjusted to modify the predetermined release force required to displace the centering projection 358 out of the centering cavity 364. The centering projection 358 and centering cavity 364 ensure that the minor forces below the release force do not cause flutter or wagging of the second base member 332 during normal riding of the bicycle 22.

When forces exceeding the predetermined release force are applied to the fender 122, the fender 122 and the second base member 332 rotate or pivot about the second pivot axis A2 and out of the centered position as shown in FIG. 15. In the situation depicted in FIG. 15, the first latch notch 360a acts on the first latch projection 352a such that the first latch member 350a is resiliently deformed and at least a portion of the first latch member 350a is forced out of the side slot 344a. The resilient deformation of the latch member 350a creates a return biasing force that, when the force on the fender 122 is removed, causes the second base member 332, and fender 122 attached thereto, to move back into the centered position.

Figure 16:
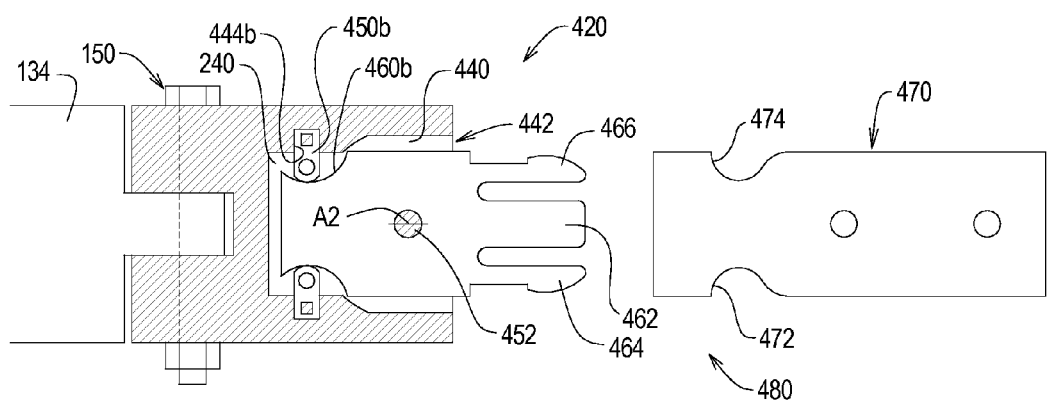
FIG. 16 is a top plan section view illustrating a third example lateral pivot system in a centered position.
Figure 17:
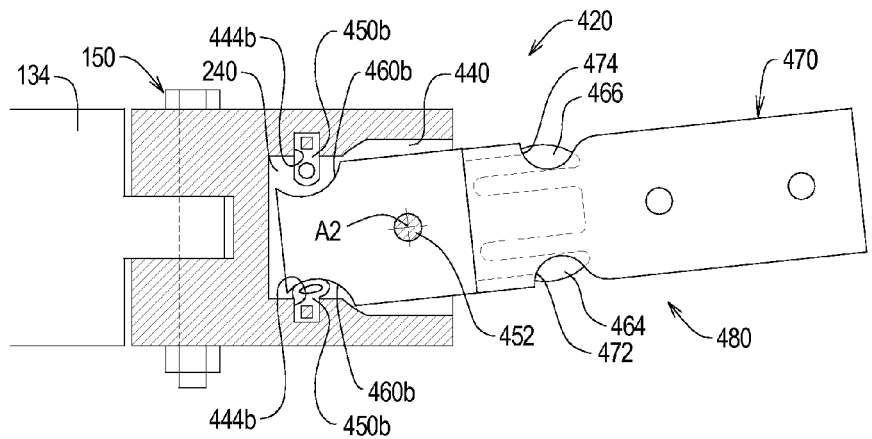
FIG. 17 is a top plan section view illustrating the third example lateral pivot system in a first side position.

Turning now to FIGS. 16 and 17 of the drawing, depicted therein is a third example lateral pivot system 420 that may be used in place of the first example lateral pivot system 126 described above. The third example lateral pivot system 420 comprises a first base member 430 and a second base member 432. The first base member 430 is adapted to be connected to the example spacing member 134 to form a vertical pivot system like the vertical pivot system 124 described above. The second base member 432 is adapted to be attached to a fender such as the example fender 122 defined above.

The example first base member 430 further defines a base chamber 440 and a main opening 442, and first and second side cavities 444a and 444b. First and second return members 450a and 450b lie partly within the first and second side cavities 444a and 444b, respectively. A pivot member 452 such as a bolt assembly, pin, or the like secures the second base member 432 for pivoting or rotating about the second pivot axis A2 relative to the first base member 430.

The second base member 432 is sized and dimensioned such that at least a portion thereof may be inserted into the base chamber 440. The second base member 432 defines first and second latch notches 460a and 460b, and the first and second return members 450a and 450b engage the first and second latch notches 460a and 460b when the second base member 432 is fully inserted into the base chamber 440.

Engagement of pivot member 452 with the first and second base members 430 and 432 prevents inadvertent movement of the second base member 432 out of the base chamber 440. To provide positive support of the second base member 432 in the center position, a centering projection like the centering projection 358 and centering cavity like the centering cavity 364 may be formed on the first and second base members 430 and 432.

The second base member 432 further comprises a center guide rod 462 and first and second hook members 464 and 466. A catch housing 470 defining first and second catch slots 472 and 474 is secured to the fender 122. The center guide rod 462 and hook members 464 and 466 form a hook end of a side release buckle assembly 480, while the catch housing 470 and catch slots 472 and 474 form a catch end of the buckle assembly 480. The use of the side release buckle assembly 480 facilitates attachment of the fender 122 to and detachment of the fender 122 from the third example lateral pivot system 420. A similar buckle assembly 480 may be used with the first and second example lateral pivot systems 126 and 320 described above.

When forces are applied to the fender 122, the fender 122 and the second base member 432 rotate or pivot about the second pivot axis A2 and from the centered position as shown in FIG. 16 and into an angle position as shown in FIG. 17. In the situation depicted in FIG. 17, the first latch notch 460a acts on the first return member 450a such that the first return member 450a is resiliently deformed. The resilient deformation of the return member 450a creates a return biasing force that, when the force on the fender 122 is removed, causes the second base member 432, and fender 122 attached thereto, to move back into the centered position.

What is claimed is:

1. A fender system for a bicycle comprising a seat assembly and a wheel, comprising:
   a first base member secured relative to the bicycle;
   a second base member supported for lateral rotation by the first base member from an initial position;

a fender extending from the second base member such that the fender is spaced above the wheel when the second base member is in the initial position; and at least one return member arranged to bias the second base member into the initial position relative to the first base member such that, when a force applied to the fender laterally displaces the second base member out of the initial position such that the fender is laterally offset from the wheel, the at least one return member returns the second base member to the initial position.

2. A fender system as recited in claim 1, in which the at least one return member comprises a spring.

3. A fender system as recited in claim 1, in which the at least one return member comprises a deformable portion of at least one of the first and second base members.

4. A fender system as recited in claim 1, in which the at least one return member comprises at least one resilient member arranged between the first and second base members.

5. A fender system as recited in claim 1, further comprising a spacing member configured to support the first base member in a desired orientation relative to the bicycle.

6. A fender system as recited in claim 5, in which the spacing member supports the first base member for vertical rotation, the system further comprising a lock system for securing a position of the first base member relative to the spacing member.

7. A fender system as recited in claim 1, in which the fender is detachably attached to the second base member.

8. A fender system as recited in claim 1, in which the first base member is secured to the seat assembly.

9. A method of supporting a fender relative a bicycle having a seat assembly and a wheel comprising the steps of:

securing a first base member relative to the bicycle;

providing a second base member, where a fender extends from the second base member;

attaching the second base member to the first base member such that the second base member may laterally rotate relative to the first base member from an initial position, and the fender is spaced above the wheel when the second base member is in the initial position; and biasing the second base member into an initial position relative to the first base member such that, when a force applied to the fender laterally displaces the second base member out of the initial position such that the fender is laterally offset from the wheel, the second base member is returned to the initial position.

10. A method as recited in claim 9, in which the step of biasing the second base member comprises the step of arranging at least one spring to act on the first and second base members.

11. A method as recited in claim 9, in which the step of biasing the second base member comprises the step of forming a deformable portion on at least one of the first and second base members.

12. A method as recited in claim 9, in which the step of biasing the second base member comprises the step of arranging at least one resilient member between the first and second base members.

13. A method as recited in claim 9, further comprising the step of connecting a spacing member between the first base member and the bicycle to support the first base member in a desired orientation relative to the bicycle.

14. A method as recited in claim 13, further comprising the steps of:

moving the first base member relative to the spacing member into a desired orientation; and securing the first base member relative to the spacing member in the desired position.

15. A method as recited in claim 9, further comprising the step of detachably attaching the fender to the second base member.

16. A method as recited in claim 9, further comprising the step of securing the first base member relative to the seat assembly.

17. A fender system for a bicycle comprising a seat assembly, comprising:

a first base member secured relative to the bicycle;

a second base member rotatably supported by the first base member;

a fender secured to the second base member; and at least one return member for biasing the second base member into an initial position relative to the first base member; wherein the at least one return member comprises a deformable portion of at least one of the first and second base members.

18. A fender system as recited in claim 17, further comprising a spacing member configured to support the first base member in a desired orientation relative to the bicycle.

19. A fender system as recited in claim 18, in which the spacing member movable supports the first base member, the system further comprising a lock system for securing a position of the first base member relative to the spacing member.

20. A fender system as recited in claim 17, in which the fender is detachably attached to the second base member.

21. A fender system as recited in claim 17, in which the first base member is secured to the seat assembly.

22. A method of supporting a fender relative a bicycle having a seat assembly comprising the steps of:

securing a first base member relative to the bicycle;

rotatably attaching a second base member to the first base member;

securing the fender the second base member; and biasing the second base member into an initial position relative to the first base member by forming a deformable portion on at least one of the first and second base members.

23. A method as recited in claim 22, further comprising the step of connecting a spacing member between the first base member and the bicycle to support the first base member in a desired orientation relative to the bicycle.

24. A method as recited in claim 23, further comprising the steps of:

moving the first base member relative to the spacing member into a desired orientation; and securing the first base member relative to the spacing member in the desired position.

25. A method as recited in claim 22, further comprising the step of detachably attaching the fender to the second base member.

26. A method as recited in claim 22, further comprising the step of securing the first base member relative to the seat assembly.

* * * * *